June 8, 1926.                                                                   1,587,728
                            C. J. HOMBACH
                 AIR REPLENISHING MEANS FOR WATER DISTRIBUTING SYSTEMS
                         Filed July 15, 1925        2 Sheets-Sheet 1
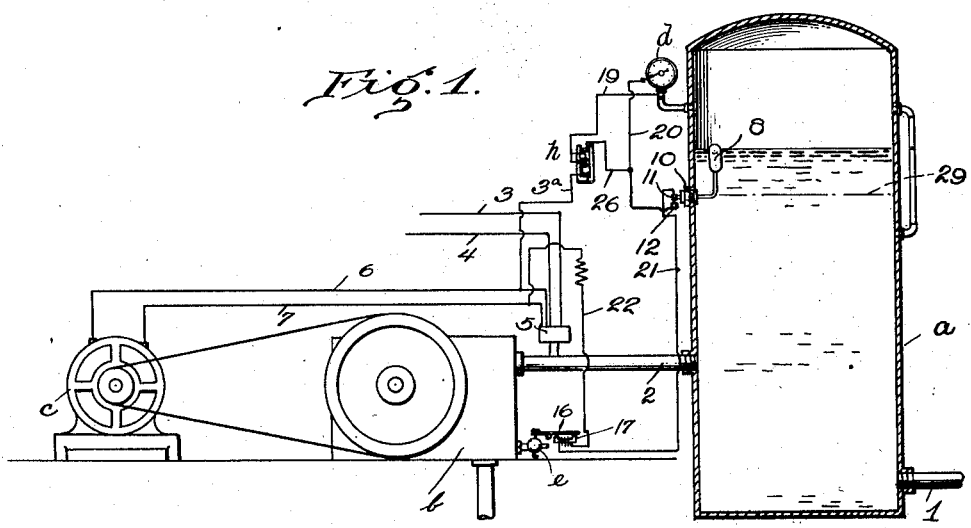
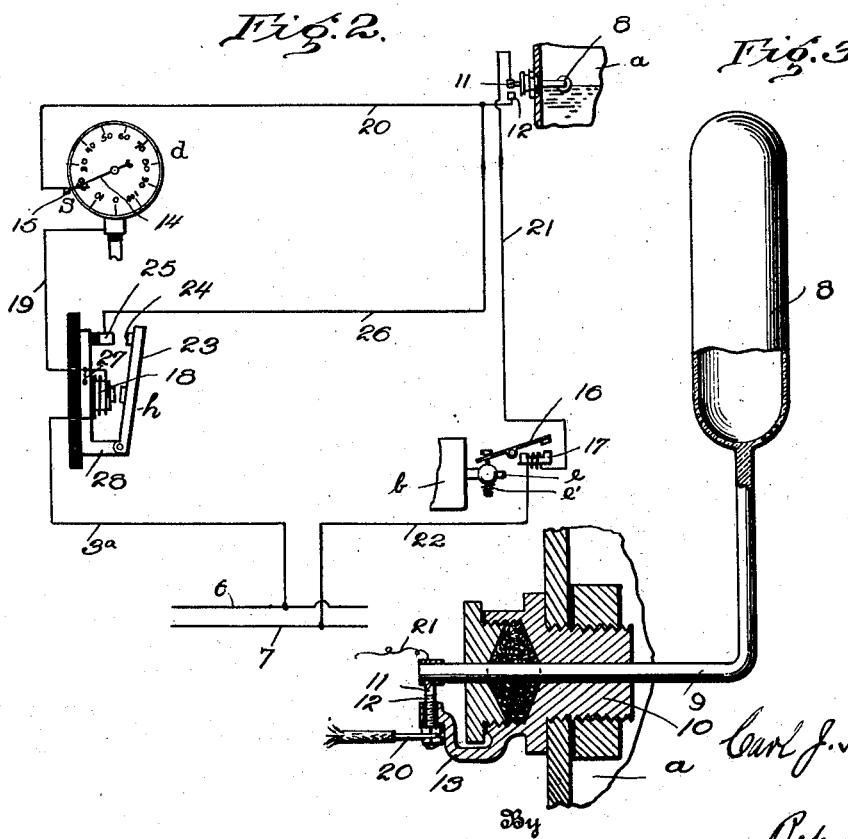
Inventor
Carl J. Hombach
By
Robert Watson
Attorney June 8, 1926.
C. J. HOMBACH
1,587,728
AIR REPLENISHING MEANS FOR WATER DISTRIBUTING SYSTEMS
Filed July 15, 1925   2 Sheets-Sheet 2
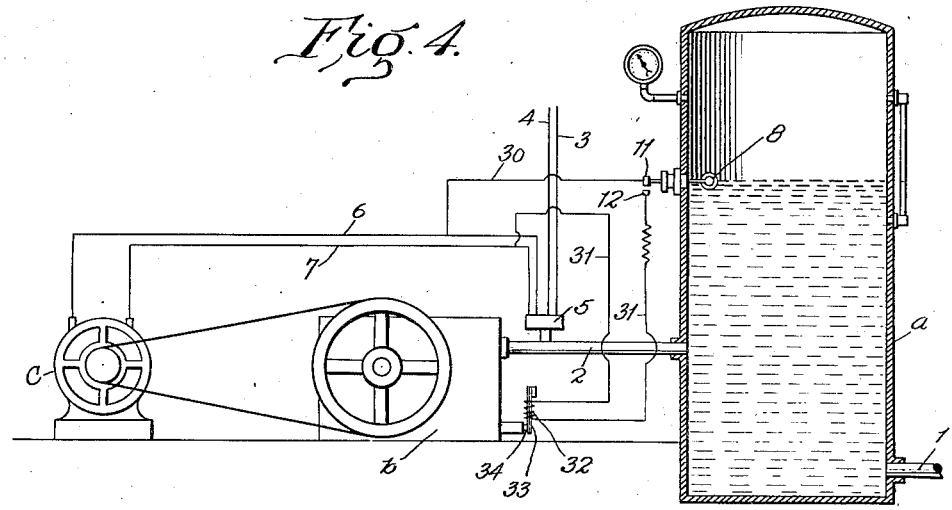
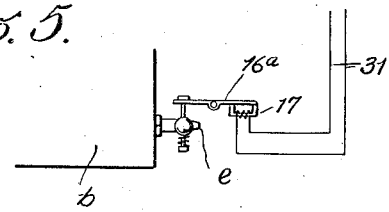
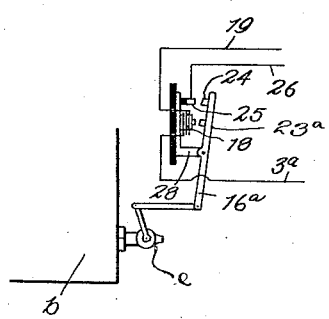

Patented June 8, 1926.

1,587,728

UNITED STATES PATENT OFFICE.

CARL J. HOMBACH, OF NORTH CALDWELL, NEW JERSEY.

AIR-REPLENISHING MEANS FOR WATER-DISTRIBUTING SYSTEMS.

Application filed July 15, 1925. Serial No. 43,803.

This invention relates to means for automatically maintaining a suitable amount of air in the pressure tanks of water distributing systems, to force the water through the service pipes. In water pumping systems using pressure tanks, the air supply in the tank gradually diminishes and if not replenished from time to time, the tank gradually fills with water and the volume of air under pressure becomes insufficient to force the water through the pipes. The system is then said to be water-logged. In order to replenish the air in the tank, the operator draws off some of the water and pumps air into the tank. By means of my improvements, the air supply in the tank is automatically replenished and it is impossible for the system to become water-logged.

In pressure systems of water distribution, where the water from the well, or other source of supply is forced into a pressure tank by a pump operated by an electric motor, a suitable pressure controlled switch, usually associated with the pipe connecting the pump with the tank, controls the motor so that when the pressure in the tank falls to a certain predetermined low limit, the motor starts, and when the pressure in the tank rises to a predetermined high limit, the motor stops. In carrying out my invention, I provide a valve for admitting air to the pump, which valve is normally closed, and, in one form of the invention, I provide an electrically operated device whose circuit is controlled jointly by a pressure-controlled switch and a float-controlled switch, for opening the air inlet valve to admit air to the pump and tank when the water level in the tank is abnormally high and the air space above the water is correspondingly reduced, and for permitting the air valve to close when the water level and the air space have become normal. In another form of the invention, I provide means whereby the electrically operated device is controlled by the float control switch alone.

In the accompanying drawing,

Fig. 1 is a diagrammatic view illustrating the invention in the form in which the air valve operating device is controlled by the pressure and float switches, the pressure tank being shown in central section;

Fig. 2 is a diagrammatic view, showing the air valve controlling devices of Fig. 1 on a larger scale;

Fig. 3 is a detail view of the float switch;

Fig. 4 is a diagrammatic view illustrating the form of the invention in which the float switch alone controls the air valve operating device, the tank being shown in central vertical section;

Fig. 5 is a detail view showing a magnet substituted for the thermal device shown in Fig. 4; and, Fig. 6 is a detail view showing the holding magnet and air valve controlling device, of Fig. 1, combined.

Referring to Figs. 1 to 3 of the drawing, $a$ represents a pressure tank in a water distributing system, having an outlet pipe 1 near the bottom, leading to the service pipes, and having an inlet pipe 2, connected to the pump $b$, operated by an electric motor $c$. Supply wires 3 and 4, leading from a suitable current source, extend to a pressure operated starting switch 5, and conductors 6 and 7 lead from the switch 5 to the motor. the switch 5 is operated in the usual manner by pressure in the pipe 2 for starting the motor when the pressure in the tank falls to a predetermined low limit, and for stopping the motor when the pressure rises to a predetermined high limit.

In the upper part of the tank is arranged a float 8, having an arm 9 which extends through a suitable stuffing box 10 in the wall of the tank. This float and the arm 9 are preferably made of glass and in the form shown, and upon the outer end of the arm 9 is arranged a metal contact 11, adapted to engage a fixed contact 12, when the water raises the float above the horizontal position, and to be moved out of engagement with said fixed contact when the float rests upon the water in horizontal position. The stationary contact 12 is carried by an arm 13, projecting from the stuffing box 10, the contact being suitably insulated from the arm. A pressure gage $d$ is connected to the interior of the tank, above the normal water level, and this gage carries an indicating hand 14, adapted to engage a stationary metal contact 15 arranged opposite the number on the gage indicating the low pressure limit at which the motor starts. The hand 14 and contact 15 constitute a pressure-controlled switch $s$. The pump is provided with an air inlet valve $e$, which is normally closed, and this valve may be opened by a lever 16, when the latter is attracted by a magnet 17. When the float switch is closed by reason of high water level, and the pressure controlled switch *s* is also closed, at the low limit of pressure at which the motor starts, a circuit will be completed through the magnet 17 as follows: from the motor lead 6, through conductor 3ᵃ to the coil of a magnet 18 of a switch *h*, thence by conductor 19 to the head of the gage *d*, thence through the gage and the arm 14 to the stationary contact 15, thence by conductor 20 to the stationary contact 12 of the float switch, thence through the movable contact 11 of said switch to conductor 21 and the coil of the magnet 17, and thence by conductor 22 to the motor lead 7. As the starting switch 5 closes at this low limit of pressure, the motor leads will be connected to the supply circuit, the motor will start, and current will flow through the circuit just traced. The magnet will then open the air valve against the action of the spring *e'*, which tends to close said valve. The operation of the motor causes the pressure in the tank to rise, and the switch *s* opens. This would break the circuit of the magnet 17, except for the interposition of the holding switch *h* in said circuit, the function of this switch being to maintain the circuit of the magnet 17 closed after the pressure switch *s* has opened and until the float switch has opened by the lowering of the water in the tank. As shown, the coil of magnet 18 of the switch *h* is in series with the circuit through the switch *s* and the coil of the magnet 17, and when the switch *s* and the float switch are both closed the armature or keeper 23 of the switch *h* is attracted by the magnet 18 and its armature carries a contact 24 which is brought into engagement with an insulated contact 25 by the attraction of the armature. The contact 25 is connected by conductor 26 to the conductor 20, and the conductor 19 is shown to be grounded at 27 on a metal support 28 for the armature 23. When the switch *h* is closed, a shunt is formed around the switch *s* and a circuit for the magnet 18 is established independently of the circuit through the switch *s*. Thus, when the switch *h* closes, current will flow from the motor lead 6 to the coil of magnet 18, thence through said coil to the ground connection 27 and support 28 to the armature 23, thence through contacts 24 and 25 and conductor 26 to the conductor 20, thence through contacts 12 and 11 of the float switch (which is closed), thence through conductor 21, coil of magnet 17 and conductor 22 to the motor lead 7. It will be evident that after the opening of the switch *s*, the switch *h* will maintain the circuit for the magnet 17 until the float switch opens, when the circuit through the magnet 17 and the switch *h* will be broken, and the armature of the latter will move to its open position and interrupt the shunt circuit through conductor 26.

In operation, assuming the dotted line 29 to represent the normal water level, at which level the bulb of the float switch lies in substantially horizontal position on the water, if the air supply in the tank is diminished the water will rise in the tank and cause the float to assume a more or less upright position, as indicated in Fig. 1. This will cause the float switch 11—12 to close. The pressure switch *s* will remain open as long as the pressure is above a predetermined low limit. With a small volume of air in the tank, this low limit will be reached with the withdrawal of a relatively small amount of water through the service pipes, and when the low limit is reached, the pressure switch *s* will close and the motor controlling switch 5 will also close, the latter connecting the motor and valve control circuits to the supply wires and causing the motor to start, while the former completes the circuit through the magnet 17, which opens the air valve and permits the pump to draw in air. This air is forced into the tank. As before stated, when the pressure switch *s* and the float switch are both closed, and the switch 5 is also closed, the current will flow through the magnet of the holding switch *h* as well as through the magnet of the air controlling valve, and the switch *h* will close simultaneously with the completion of the circuit. As the pump continues to force air, or air and water, into the tank, the pressure in the tank rises and the pressure indicating arm 14 moves and opens the switch *s*; but the switch *h*, being closed, maintains the circuit for the magnet 17 after the switch *s* has opened, and this circuit will be maintained until the water level is lowered to the point where the float switch opens the circuit through the magnets 17 and 18 at the contacts 11 and 12. As the water level and the pressure are lowered by the withdrawal of water from the service pipes, if the float switch contacts are set so as to close with a slight rise in the water level above the normal, the float switch will always open before the motor switch opens. When the pressure in the tank reaches the high predetermined limit, the motor switch will open and current will be cut off from the valve-controlling circuits, so that no current will pass through these circuits except when the water level is high and the motor is in operation.

As the magnet of the holding switch and the magnet for operating the air valve are energized and deenergized simultaneously, one of these magnets may be dispensed with by combining the holding switch with the air valve lever as shown in Fig. 6. In this figure, the arm 23ᵃ of the holding switch has an extension 16ᵃ, beyond its pivotal point, which normally holds the spring pressed valve e in closed position. When the magnet of the holding switch is energized, it will be evident that it will cause the switch to be closed and the air valve to be opened, and when the magnet is de-energized, the switch will fall open and allow the valve to close.

In Fig. 4, I have shown a system in which the pressure switch and the holding switch in the circuits controlling the air valve are omitted, and the float switch controls the device for admitting air to the pump. In this view, the parts which are the same as in the previously described figures are similarly marked. As shown, a conductor 30 extends from the motor lead 6 to contact 11 of the float switch, and from the contact 12 of said switch a conductor 31 extends to the resistance winding 32 of a thermal device 33, and thence to motor lead 7. This thermal device normally holds an air valve 34 on the pump closed; but when the coil 32 becomes heated by the passage of current, the device operates to open the air valve.

In operation, as long as the water level in the tank is normal, the float switch remains open and no current can flow through the circuit 30—31; but when the water level is above normal, owing to the diminution of the air supply in the tank, the float switch will close. Then, when the motor switch 5 closes, upon drop in pressure, the motor will start and current will flow through the coil of the thermal device. This coil will become quickly heated and the device will cause the air valve to open so that air will be pumped into the tank. When the water level again becomes normal, the float switch will open, the thermal device will cool and the air valve will close.

If desired, an electromagnet such as shown in Figs. 1 and 2, and in Fig. 5, may be substituted for the thermal device shown in Fig. 4, for opening the air valve. Also, if desired, thermally operated devices may be substituted for the air controlling magnet and the holding switch magnet of Figs. 1 and 2.

From the foregoing, it will be seen that I have provided means for automatically replenishing the air in pressure tank systems of water distribution, and by the use of my invention the system cannot become waterlogged.

What I claim is:

1. In a water-distributing system, the combination with a pressure tank having an air chamber, a pump for forcing water into said tank, an electric motor for operating the pump and a switch controlled by the pressure in the tank for starting and stopping the motor, of a normally closed air inlet for the pump, an electrically operated device for opening said inlet, a circuit for said device adapted to be connected to the current source through said starting switch, said circuit being open when the water level in the tank is normal, and means for completing said circuit when the water level is above normal.

2. In a water-distributing system, the combination with a pressure tank having an air chamber and a pump for forcing water into said tank, of a normally closed air inlet for the pump, an electrically operated device for controlling the opening and closing of said inlet, a circuit for said device, and a pressure operated switch and a float operated switch controlling said circuit.

3. In a water-distributing system, the combination with a pressure tank having an air chamber and a pump for forcing water into said tank, of a normally closed air inlet for the pump, an electrically operated device for controlling the opening and closing of said inlet, a float-operated switch in said circuit adapted to close when the water in the tank is above a predetermined level, a pressure-operated switch in said circuit adapted to close when the pressure in the tank is relatively low and to open when the pressure is raised, and an electrically operated holding switch adapted to establish and maintain a shunt around said pressure-operated switch until the float-operated switch opens.

4. In a water-distributing system, the combination with a pressure tank having an air chamber and a pump for forcing water into said tank, of a normally closed air inlet for the pump, an electrically operated device for opening said inlet, and a float-operated switch controlling the circuit of said device.

5. In a water-distributing system, the combination with a pressure tank having an air chamber and a pump for forcing water into said tank, of a normally closed air inlet for the pump, an electrically operated device for opening said inlet, a float within the tank, an arm connected to the float and extending through the wall of the tank and a switch external to the tank and operated by said arm, said switch controlling the circuit of said device.

In testimony whereof I hereunto affix my signature.

CARL J. HOMBACH.